United States Patent
Wolff et al.

(10) Patent No.: US 11,912,261 B2
(45) Date of Patent: Feb. 27, 2024

(54) COMBINATION OF A TRACTION VEHICLE AND AN IMPLEMENT

(71) Applicant: Deere & Company, Moline, IL (US)

(72) Inventors: Kilian Wolff, Mandelbachtal (DE); Daniel Rossnagel, Engelsbrand (DE)

(73) Assignee: Deere & Company, Moline, IL (US)

( * ) Notice: Subject to any disclaimer, the term of this patent is extended or adjusted under 35 U.S.C. 154(b) by 616 days.

(21) Appl. No.: 17/247,696

(22) Filed: Dec. 21, 2020

(65) Prior Publication Data

US 2021/0188240 A1  Jun. 24, 2021

(30) Foreign Application Priority Data

Dec. 20, 2019  (DE) .......................... 102019220445.7

(51) Int. Cl.
| | |
|---|---|
| *B60W 10/20* | (2006.01) |
| *A01F 15/07* | (2006.01) |
| *A01F 15/08* | (2006.01) |
| *B60W 10/04* | (2006.01) |
| *G05D 1/00* | (2006.01) |
| *G05D 1/02* | (2020.01) |

(52) U.S. Cl.
CPC ............. *B60W 10/20* (2013.01); *A01F 15/07* (2013.01); *B60W 10/04* (2013.01); *G05D 1/021* (2013.01); *A01F 15/0883* (2013.01); *B60W 2300/152* (2013.01); *B60W 2710/207* (2013.01); *B60W 2710/30* (2013.01); *G05D 2201/0201* (2013.01)

(58) Field of Classification Search
CPC ................. B60W 10/20; B60W 10/04; B60W 2300/152; B60W 2710/207; B60W 2710/30; A01F 15/07; A01F 15/0883; G05D 1/021; G05D 2201/0201
See application file for complete search history.

(56) References Cited

U.S. PATENT DOCUMENTS

| | | |
|---|---|---|
| 2012/0240546 A1 | 9/2012 | Kormann |
| 2017/0118918 A1 | 5/2017 | Chaney et al. |
| 2018/0325013 A1 | 11/2018 | Boydens et al. |

FOREIGN PATENT DOCUMENTS

| | | |
|---|---|---|
| DE | 102006011135 A1 | 9/2007 |
| DE | 102009047585 A1 | 6/2011 |
| DE | 102016002123 A1 | 8/2017 |

(Continued)

OTHER PUBLICATIONS

Extended European Search Report and Written Opinion issued in European Patent Application No. 20208202.0, dated May 6, 2021, in 10 pages.

(Continued)

*Primary Examiner* — Michael D Lang (57) ABSTRACT

A system for picking up, bundling and depositing agricultural material having a traction vehicle and a towed implement, the system comprising: an actuator associated with the implement; a control device configured to generate control data for controlling the orientation of the implement and steering of the traction vehicle, the control data including information relating to the orientation of the implement adjustable by the actuator, a desired orientation of the deposited agricultural material and at least one of a speed and a direction of travel of the traction vehicle; and wherein, using the control data, the actuator adjusts the orientation about a vertical axis of the implement relative to the traction vehicle to deposit the agricultural material.

17 Claims, 3 Drawing Sheets

(56) References Cited

FOREIGN PATENT DOCUMENTS

| | | |
|---|---|---|
| EP | 1266553 A2 | 12/2002 |
| EP | 1685759 A1 | 8/2006 |
| EP | 1926364 A1 | 6/2008 |
| EP | 2149293 A1 | 2/2010 |
| WO | WO2007031093 A1 | 3/2007 |

OTHER PUBLICATIONS

R. Huhnke, Round Bale Orientation Effects on Alfalfa Hay Storage, Applied Engineering in Agriculture 1993, pp. 349-351, vol. 36(4)—Jul. 1993.

COMBINATION OF A TRACTION VEHICLE AND AN IMPLEMENT

RELATED APPLICATIONS

This document claims priority based on German Patent Application No. 102019220445.7, filed on Dec. 20, 2019, which is hereby incorporated by reference into this application.

DESCRIPTION

This disclosure relates to a combination of a traction vehicle and a towed implement for picking up, bundling and depositing agricultural material.

BACKGROUND

In some agricultural operations material, in particular harvested crop material, is picked up from a field, bundled or pressed into bales and the collected material is deposited on the field. Often combinations of a traction vehicle, generally an agricultural tractor, and an implement for picking up and bundling the material, for example a baler, are used during these operations. When depositing the material, it may be expedient not to deposit the collected material simply in the respective direction of travel of the combination of the traction vehicle and implement, but in a different direction. An example thereof might be a round-baler in which the bale might have to be deposited with its axis transversely to a slope in order to prevent the bale from rolling down the slope.

SUMMARY

A system for picking up, bundling and depositing agricultural material having a traction vehicle and a towed implement, the system comprising: an actuator associated with the implement; a control device configured to generate control data for controlling the orientation of the implement and steering of the traction vehicle, the control data including information relating to the orientation of the implement adjustable by the actuator, a desired orientation of the deposited material and at least one of a speed and a direction of travel of the traction vehicle; and wherein, using the control data, the actuator adjusts the orientation about a vertical axis of the implement relative to the traction vehicle to deposit the agricultural material.

A method for picking up, bundling and depositing agricultural material having a traction vehicle and a towed implement, the method comprising: picking up an agricultural material from a field; bundling the agricultural material within the implement; generating control data, with a control device, corresponding to orientation of the implement, desired orientation of the deposited agricultural material and at least one of a speed and a direction of travel of the traction vehicle; and adjusting, with an actuator, the orientation of implement according to the control data, such that bundled material will be deposited in a desired orientation different from a standard orientation.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

A combination of a traction vehicle and a towed implement for picking up, bundling and depositing agricultural material is proposed, wherein the orientation of the implement relative to the traction vehicle is adjustable by an actuator, and a control device is configured to provide control data for the actuator, and for the controlling the speed and direction of travel of the traction vehicle, which are suitable for moving the implement into an orientation which is appropriate for depositing the material.

In one example, the disclosure provides a combination of a traction vehicle and a towed implement for producing and depositing bundled agricultural material, in which a positioning of the material in a desired position is possible in a simple and time-saving manner.

In other words, it is proposed to provide control data from a control device, the control device controlling not only an actuator but also a control of the speed and/or direction of travel and being able to be activated thereby in order to move the implement about the vertical axis into an orientation which is appropriate for depositing the material, whether by the hand and/or foot of the operator or by an automated system. In this manner, the positioning of the implement in the appropriate orientation is simplified for the operator and the depositing process is accelerated.

The control device may be configured to transmit the control data for the actuator automatically to the actuator and/or to transmit the control data to a user interface for providing instructions to an operator for manual activation of the actuator. The control device may be configured to transmit the control data for the steering and/or for controlling the speed and/or direction of travel of the traction vehicle to a steering actuator of the traction vehicle and/or a device for controlling the speed and/or direction of travel of the traction vehicle and/or to transmit the control data to a user interface for providing instructions to an operator for the manual activation of steering which may be actuated by the operator and/or a device for controlling the speed and/or direction of travel of the traction vehicle which may be actuated by the operator.

During an end phase of a procedure in which the material is picked up and bundled, the control device may be configured to provide control data for the actuator, resulting in the implement being laterally offset relative to the traction vehicle and namely offset to the right when the implement has to be rotated counterclockwise into the appropriate orientation relative to the current orientation of the implement, and offset to the left when the implement has to be rotated clockwise into the appropriate orientation relative to the current orientation of the implement. The control device may be configured to activate the lateral offset as a function of a working width of a crop pick-up system of the implement and the width determined by sensor of a swath of material to be picked up.

After the end of the procedure in which the material is picked up and bundled, the control device may be configured to provide control data for controlling the speed of the traction vehicle, which bring the traction vehicle to a standstill. After the end of the procedure in which the material is picked up and bundled, the control device may be configured to provide control data for the actuator, which result in the implement rotating relative to the traction vehicle about the vertical axis in the direction of the appropriate orientation. The control device may issue a command for lifting up a crop pick-up system of the implement before providing the control data for the actuator.

After the rotation of the implement about the vertical axis, which is effected by actuating the actuator, the control device may be configured to provide control data for the steering and for controlling the speed and direction of travel of the traction vehicle, which result in the traction vehicle traveling in a reverse direction relative to the direction of travel when picking up the material, and namely in a direction of travel oriented to the left relative to the direction of travel relevant for the pick-up of the material, when the implement has to be rotated counterclockwise into the appropriate orientation relative to the current orientation of the implement, and in a direction of travel oriented to the right relative to the direction of travel relevant for the pick-up of the material, when the implement has to be rotated clockwise into the appropriate orientation relative to the current orientation of the implement.

During reverse travel, the control device may be configured to provide control data for steering the traction vehicle, which result in the rotation of the traction vehicle running in the direction opposing the previous rotational direction of the traction vehicle, as soon as the angle between the traction vehicle and implement has reached a maximum angle. This angle may be directly detected by sensor, in particular using a feedback sensor for detecting the angle between the drawbar, on the one hand, and the implement and/or the traction vehicle, on the other hand, or indirectly determined using a distance passed through or a time.

The control device may be configured to provide control data which result in an actuation of the actuator and/or a steering procedure and/or reverse travel of the traction vehicle being terminated when the implement has reached the appropriate orientation.

The implement may be a round baler and the control device may be configured to determine the order of the described sequence such that a round bale deposited by the implement is oriented with its axis of symmetry parallel to a slope inclination of the cultivated field.

The actuator may be configured to adjust the angle of a drawbar between the traction vehicle and the implement, relative to the implement and/or relative to the traction vehicle.

When depositing the material, it may be expedient not to deposit the collected material simply in the standard direction, i.e., the direction respective direction of travel of the combination of the traction vehicle and implement, but in a different non-standard direction. An example thereof might be a round baler in which the bale might have to be deposited with its axis transversely to a slope in order to prevent the bale from rolling down the slope. It may also be expedient to orientate bales for storage in the east-west direction rather than in the north-south direction (R. Huhnke, Round Bale Orientation Effects on Alfalfa, Applied Engineering in Agriculture 1993, pp. 349-351) or to deposit bales in a specific orientation of the axis of the bale in order to avoid, if required, that the bale rolls away (European Patent Application No. EP 2 149 293 A1). It could also be expedient to deposit the bales in a specific orientation in order to remove the bales after a specific collecting or loading process, for which purpose rectangular bales, for example, could be deposited transversely to the direction of travel during the production of the bales.

In some approaches (e.g., German Patent Application Nos. DE 10 2006 011 135 A1 and DE 10 2009 047 585 A1) it is proposed for a combination of an agricultural tractor and a round baler to detect with a sensor the inclination of the terrain recently traveled over and, with a display device which instructs the operator or an automated system, to position the baler or the depositing device thereof using an articulated drawbar such that the roll axis of the bale follows the slope inclination or the bale is deposited with its front surface on the ground. In this case, therefore, it is only the baler which is moved rather than the agricultural tractor. A positioning of a baler using only a steering drawbar or articulated drawbar, however, is not feasible in practice in any case when greater angles are required between the agricultural tractor and the baler, and a depositing device which is adjustable relative to the baler is technically complex.

Figure 1:
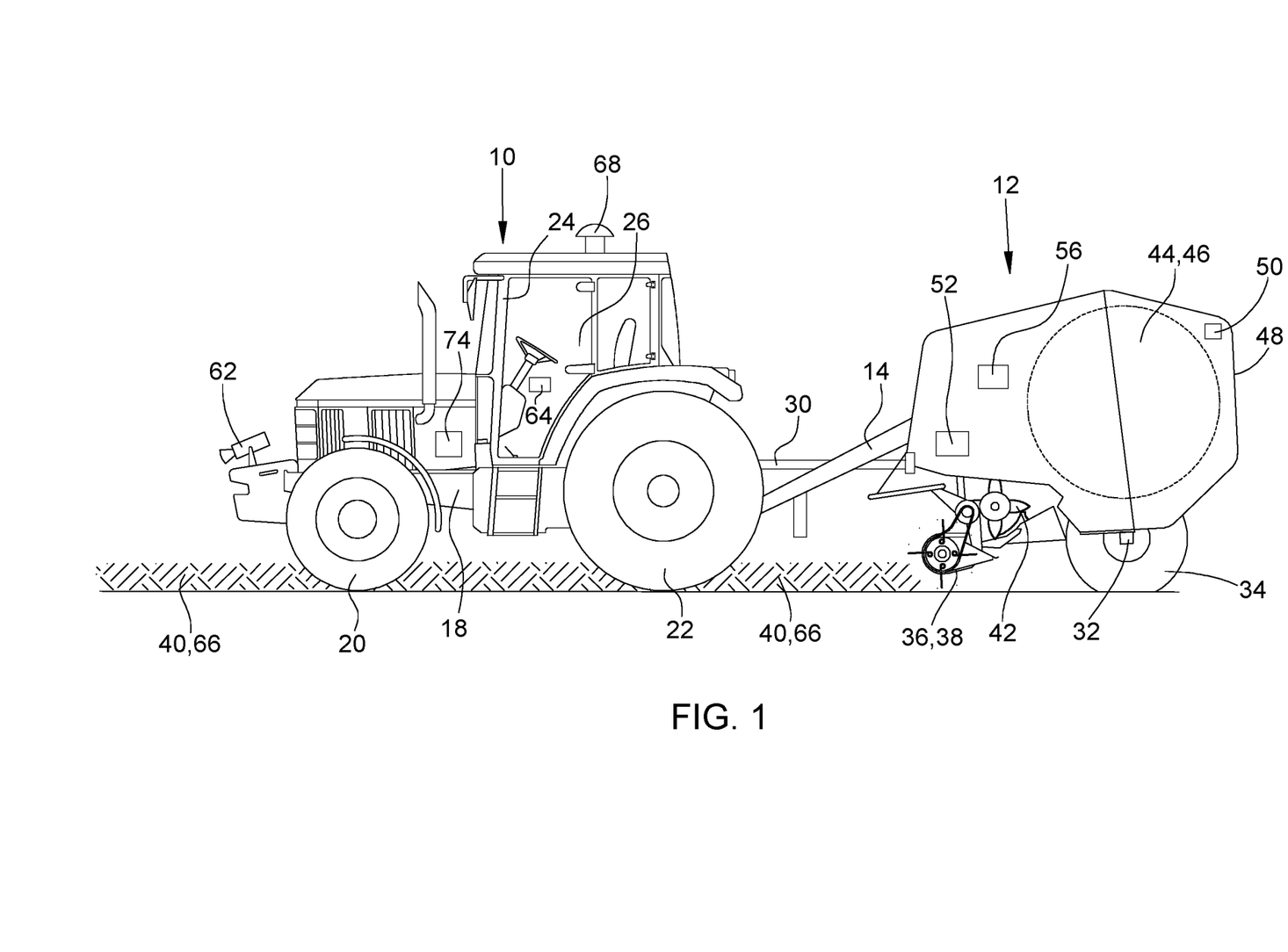
FIG. 1 shows a lateral view of a traction vehicle with a towed implement.

FIG. 1 shows a lateral view of an agricultural traction vehicle 10 in the form of a tractor and an implement 12 which is coupled to a drawbar 14 to a trailer hitch 28 of the traction vehicle 10 and which is in the form of a roundbaler of variable pressing chamber size, which serves for picking up and bundling agricultural material (harvested crops in the form of grass or hay, or the like, which lies in a swath 40 on the field). The traction vehicle 10 is constructed on a load-bearing frame 18 which is supported on steerable front wheels 20 and drivable rear wheels 22 and bears a cab 24 in which an operator workstation 26 is located.

The implement 12 comprises a chassis 32 which is supported via steerable wheels 34 on the ground, a processing element 36 in the form of a crop pick-up system 38 for picking up harvested crops located in the swath 40 on the ground and a conveyor 42 which conveys the harvested crops picked up by the crop pick-up system 38 into a container 46 in the form of a bale pressing chamber 44, in which the harvested crops are bundled (i.e. pressed). The bale pressing chamber 44 is delimited in a manner known per se by pressing apparatus (not shown) in the form of belts. A finished bale may be ejected through an upwardly pivotable rear door 48 (which could also be complemented or replaced by a mechanism for moving the pressing apparatus in the rear region of the bale pressing chamber into an ejection position) and deposited on the field. The mechanical drive of the driven elements of the implement 12 is carried out via a power take-off shaft 30 from the traction vehicle 10 or using electric motors which are supplied with electrical energy from the traction vehicle 10.

Figure 2:
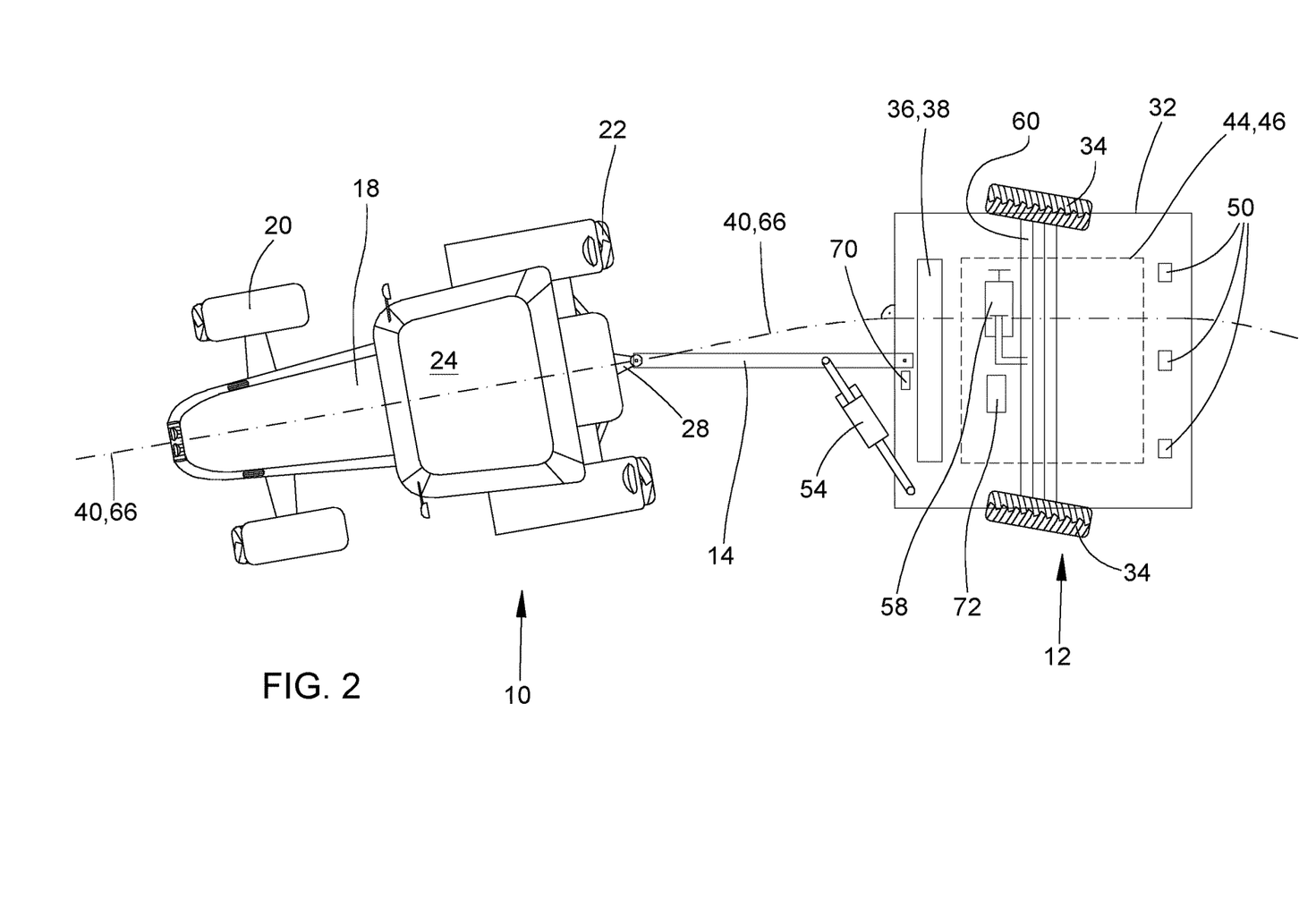
FIG. 2 shows a plan view of the traction vehicle and the implement.

A total of three sensors 50 are distributed over the width of the container 46, said sensors serving for detecting the diameter of the bale and/or for detecting the tension of the pressing apparatus, and which also contain information about the distribution of the harvested crops over the width of the container 46. The sensors 50 are connected to a control device 52 which is located on-board the implement 12 but also could be located on-board the traction vehicle 10. The control device 52 is connected via a valve arrangement 56 (which could also be located on-board the traction vehicle 10) to a first actuator 54 in the form of a hydraulic cylinder which is articulated at one end on the drawbar 14 and at the other end on the chassis 32 of the implement 12. The control device 52 is also connected via the valve arrangement 56 to an (optional) second actuator 58 in the form of a hydraulic cylinder, which is coupled to a rod 60 for pivoting the wheels 34 of the implement 12 about the vertical axis. The control device 52 is informed by feedback sensors 70, 72 about the current angles of the drawbar 14 and the wheels 34. The feedback sensor 70 for detecting the angle of the drawbar 14 could also be attached between the drawbar 14 and the traction vehicle 10 on the trailer hitch 28 or in the vicinity thereof or replaced or complemented by a camera.

A detection device 62 in the form of a camera is attached to the front face of the traction vehicle 10, said detection device optically detecting the swath 40 and being connected to an image processing system which outputs a steering signal to a steering controller 64 of the traction vehicle 10, which in turn adjusts the steerable front wheels 20 of the traction vehicle 10 via a suitable actuator (not shown) in such a manner that the longitudinal central axis of the traction vehicle 10 is guided at least approximately on a reference line 66 which corresponds to the longitudinal axis of the swath 40. In a further embodiment, data regarding the position of the swath is stored in the steering controller 64 and a position determining device 68 (for example in the form of a GPS antenna) transmits to the steering controller 64 current position information which together with the stored data regarding the position of the swath from the steering controller 64 serve for activating the actuator for the steerable front wheels 20. Both variants mentioned in this paragraph may also be combined (see European Patent Application No. EP 1 266 553 A2). The steering controller 64 continuously transmits to the control device 52 data regarding the lateral position of the reference line 66 relative to the longitudinal central axis of the traction vehicle 10 and the associated point in time of the detection and/or the associated position in the forward direction and to this end is connected to the control device 52 via a bus. A device for controlling the speed and direction of travel 74 controls the travel speed and direction of travel of the vehicle, i.e. the absolute value of the travel speed of the traction vehicle 10 and whether it travels forwards or backwards. The speed of the traction vehicle 10 and thus of the implement 12, selected from the device for controlling the speed and/or direction of travel 74 when producing the bale, may depend in a manner known per se on the dimensions and the density of the swath 40, which may be detected by the detection device 62 and optionally additional sensors, or may be stored in advance in the previous working process together with the coordinates of the swath 40.

Figure 3:
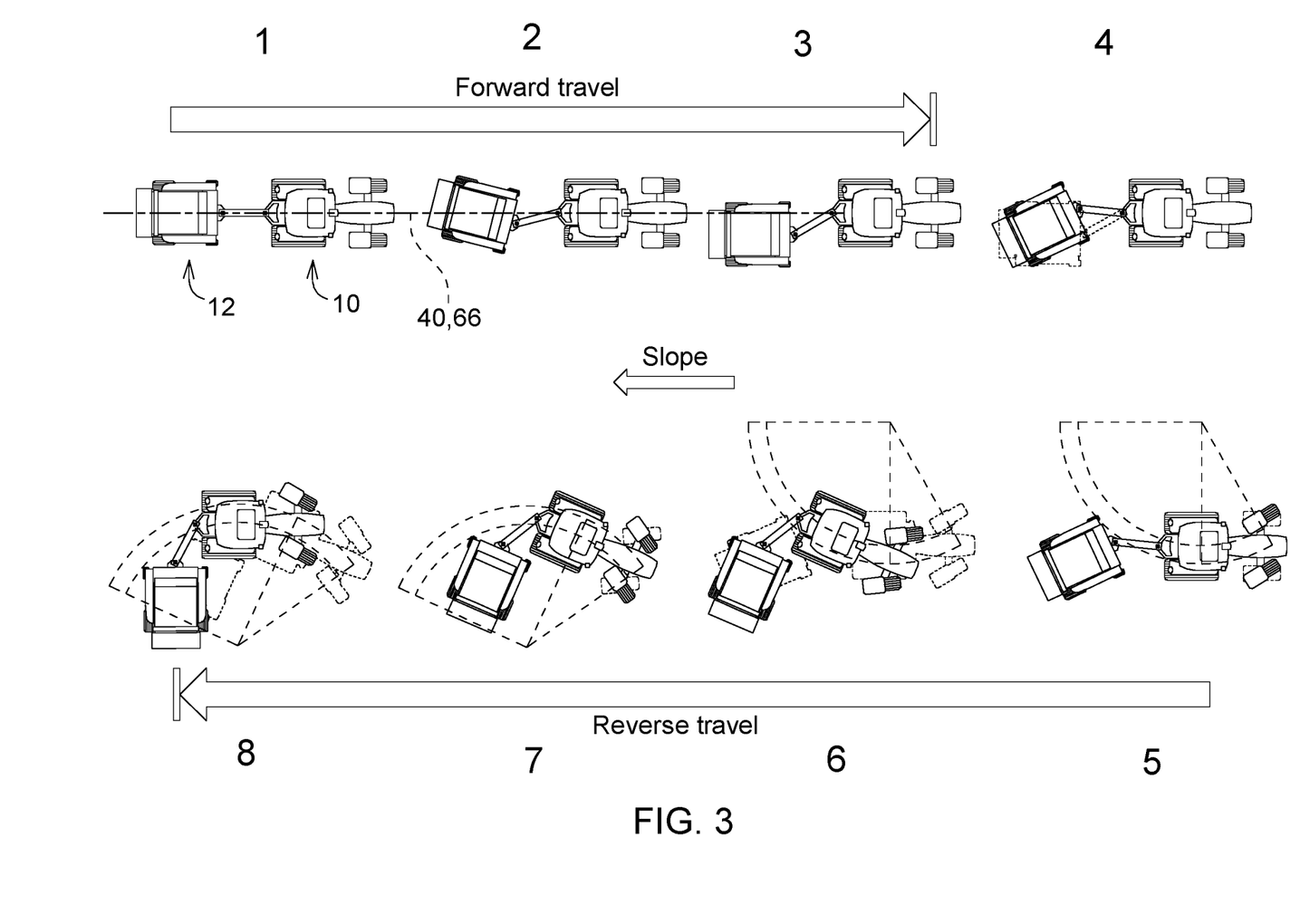
FIG. 3 shows a diagram which shows the mode of operation of the control device of the implement.

The mode of operation of the control device 52 when picking up the swath 40 is implemented in a manner known per se, such that when picking up the swath 40 the traction vehicle 10 is guided along the reference line 66. The implement 12, controlled by the control device 52 on the basis of the signals of the sensors 50 and optionally the detection device 62, is successively moved to the left and right relative to the traction vehicle 10 by the first actuator 54 and the optional second actuator 58, in order to fill the bale pressing chamber 44 equally over the width thereof since the width of the swath 40 is generally smaller than that of the bale pressing chamber 44. In this case, it is possible to proceed like European Patent Appl. No. EP 1 926 364 A1 or German Patent Application No. DE 10 2009 047 585 A1. FIG. 3 shows in phase 1 the conventional pick-up of the swath 44.

As soon as the bale is finished it is ejected out of the bale pressing chamber 44 by the door 48 being opened. In practice, the field from which the swath 40 is picked up and on which the finished bale is deposited may not be horizontal in all cases but may be inclined. In FIG. 3 it is assumed that the field is inclined to the left, thus the traction vehicle 10 travels exactly uphill. If the bale were to be ejected with the implement 12 being located with its longitudinal central axis in the direction of the slope inclination (as is the case in phase 1 of FIG. 3) it would ultimately roll down the slope, which is not desired for many reasons, amongst other things due to the danger ensuing therefrom.

In the situation shown in FIG. 3 the implement 12 might have to be rotated by 90° about the vertical axis from the orientation shown in phase 1. In some examples, providing a manual control by the driver, requires the driver to push back the implement 12 by manual steering operations and speed presettings in order to achieve a suitable orientation of the implement 12 relative to the slope inclination, whilst previous automated suggestions (German Patent Application Nos. DE 10 2006 011 135 A1 and DE 10 2009 047 585 A1) have referred only to an automatic adjustment of the implement 12 relative to the traction vehicle 10 by the adjustable drawbar 14 which—without any movement of the traction vehicle 10—for obvious reasons is not sufficient to position the implement 12. The steerable drawbar 14 between the implement 12 and the traction vehicle makes it possible—in combination with a suitable movement control of the traction vehicle 10—to simplify, to shorten and to automate the process of positioning the implement 12. The steerable drawbar 14 also has further advantages such as, for example, improved tracking on corners and the so-called "weaving" for optimized filling of the bale pressing chamber 44 without the operator of the traction vehicle 10 being continuously subjected to lateral movements.

An automated ejection process is shown in FIG. 3 and in the following description, in which the implement 12 is positioned parallel to the slope before the ejection of the bale. The ejection process is intended to be fully automated when traveling on the slope so that the driver of the traction vehicle 10 no longer has to manually intervene for this purpose, although it could also be conceivable to provide the driver at his operator work station 26 with visual or acoustic instructions so that the driver is able to operate the actuator 54 and the input terminal of the device for controlling the speed and direction of travel 74 in a manner similar to the described automatic sequence.

Using a suitable sensor system (for example an inertial measuring unit (IMU) which in a manner known per se may be integrated into the housing of the position determining device 68, and/or digitally available topographical information which has been generated previously or during operation by the position determining device 68—connected via the bus to the control device 52—or a suitable sensor system of the implement 12) the slope inclination is determined and/or detected (both the pitch angle in the forward direction and the roll angle in the transverse direction relative to the direction of travel of the combination of traction vehicle 10 and implement 12). Using the slope inclination, an automated sequence is performed in order to move the implement 12, before ejecting the bale, into a suitable position in which the bale may be ejected without the problem of rolling away. In order to design this sequence as effectively as possible, the solution with the shortest travel distance is preferred since a longer travel distance requires more time and thus unnecessarily lengthens the entire procedure. FIG. 3 illustrates the sequence described hereinafter.

During the production of the bale, the combination of the traction vehicle 10 and the implement 12 travels along the reference line 66 and/or the swath 40. On the basis of the signals of the sensors 50 of the implement 12 it is identified when the implement 12 is in the end phase of the production of the bale, i.e. the bale will have reached the desired diameter within a time span of a few seconds. With a corresponding step, i.e. during this end phase, the drawbar 14 is deflected by actuating the actuator 54 such that (phase 2 in FIG. 3) when reaching the desired diameter the implement 12 has reached a quasi-static position which is offset adjacent to the tractor path (phase 3 of FIG. 3).

The direction in which the implement 12 has to be rotated about the vertical axis in order to move it into the (reference) orientation about the vertical axis determined by the control device 52 is dependent on the pitch angle and roll angle of the cultivated terrain: when traveling uphill the implement 12 has to be offset uphill corresponding to the measured roll angle, so that ultimately with its longitudinal central plane it is oriented transversely to the slope (phase 8 in FIG. 3). When traveling downhill the implement 12 must be offset downhill according to the measured roll angle. The lateral offset of the implement 12 in phase 3 of FIG. 3 is selected such that the implement 12 travels and stands to the right adjacent to the traction vehicle 10, which simplifies the subsequent rotation about the vertical axis counterclockwise, as results from the subsequent phases of FIG. 3. If the implement is to be rotated clockwise about the vertical axis, the implement 12 in phase 3 would be positioned to the left of the traction vehicle. The direction in which the baler is deflected in phases 2 and 3 may also be influenced under conditions, however, by the available space to avoid depositing the bale too close to obstacles, field boundaries or adjacent swaths. The lateral offset between the traction vehicle 10 and the implement 12 is selected such that no harvested crops remain lying on the field, i.e. the swath 40 remains within the working width of the pick-up system 38. To this end, a camera system (for example the detection device 62) may be used in order to determine the width of the swath 44 and to transmit this to the control device 52, which provides the signals for the actuator 54 dimensioned in the described manner.

After the vehicle combination in phase 3 has come to a standstill, when the traction vehicle 10 is stationary, the drawbar 14 is deflected in the opposing direction by the control device 52 by a command from the actuator 54 (phase 4) so that the implement 12 already performs a certain rotation in the desired direction. Since the crop pick-up system 38 in this case performs a lateral movement, it may be initially lifted by a suitable actuator (see German Patent Appl. No. DE 10 2016 002 123 A1). Depending on the dimensions and degree of freedom of the drawbar 14, a corresponding alteration to the orientation of the implement 12 relative to the slope and thus the pitch angle is already achieved by this movement. This rotation is potentially already enough in order to be able to eject the bale safely.

If this is not the case, by corresponding activation of the device for controlling the speed and direction of travel 74 of the traction vehicle 10 by the control device 52, the steering of the traction vehicle 10, in particular, may be turned to a maximum extent (to the left, as shown in phases 5 and 6 when the implement 12 has to be rotated counterclockwise, and to the right when the implement 12 has to be rotated clockwise) and a reverse travel of the traction vehicle 10 and thus of the implement 12 may be initiated in order to bring the traction vehicle onto the circular path shown at that point in phases 5 and 6. The steering of the traction vehicle 10 is reversed by the control device 52 when, as shown in phase 7, a maximum angle of 90° is reached between the longitudinal axis of the traction vehicle 10 and the longitudinal axis of the implement 12, wherein the maximum angle may also be greater or less than 90° and, amongst other things, depends on the geometry of the drawbar 14 and the traction vehicle 10 and may be selected such that it is avoided that the drawbar 14 strikes the traction vehicle 10 and/or that the combination of the traction vehicle 10 and the implement 12 jack-knifes by angles which are too great. Finally, in phase 8 the orientation of the implement 12 is exactly at right angles to the original direction of travel and transversely to the slope inclination. This position is expedient when the original direction of travel runs exactly uphill and/or downhill, otherwise the sequence may have been already previously interrupted when the (reference) orientation of the implement 12 about the vertical axis which is appropriate for depositing the bale was reached, which may be determined using the measured pitch angle of the implement 12. The described sequence is accordingly terminated as soon as the pitch angle of the implement 12 is less than a fixed threshold value which permits the safe ejection of the bale. It might also be mentioned that in the case of a slope inclination running exactly parallel to the direction of travel of the combination during the pick-up of the swath 40, as is shown in FIG. 3, a clockwise rotation of the implement 12 might also be possible.

The bale is finally ejected from the implement 12 and the steps 8 to 5 of the sequence shown in FIG. 3 are performed in each case in the reverse direction (by corresponding control of the actuator 54 for the drawbar 14 and the device for controlling the speed and direction of travel 74) in order to align the combination of the traction vehicle 10 and implement 12 on the swath 44 and to move said combination further along the swath 40 and to bundle the harvested crops.

The above-described sequence which is passed through is based on the controller 52 activating the actuator system (actuator 54 of the drawbar, if required assisted by the optional actuator 58 for the steering of the wheels 34 of the implement 12 and the device for controlling the speed and direction of travel 74 of the traction vehicle 10) based on signals from sensors, namely the sensors 50 for detecting the bale size for initiating phases 1 to 3, the feedback sensor 70 for detecting the position of the drawbar 14 for controlling the offset in phases 2 and 3, and for changing from phase 6 to phase 7, as well as the sensor system for detecting the pitch angle of the implement 12 for terminating the sequence and for ejecting the bale. The different values may be directly detected by the sensors or the values are indirectly detected, for example by measuring covered distances or speeds and associated times and the steering angles.

Instead of this sequence controlled by direct or indirectly detected measured values, for example, also conceivable is a controlled sequence based on signals of the position determining device 68—optionally in cooperation with other sensors which are attached to the implement 12, the traction vehicle 10 and/or the drawbar 14, in order to detect in particular the roll angle and/or pitch angle—using a path planned by the control device 52 and automatically passed through and which is selected using the known and/or sensor-determined three-dimensional topography of the field, such that ultimately the bale is deposited with a suitable orientation.

In the mode of operation described herein, a control of the functions of the traction vehicle 10 is used by the control device 52 of the implement 12, a use of the ISO standard 17783 and in particular the so-called TIM (Tractor Implement Management) standard being provided therefor, in order to automate the steering, the lifting of the pick-up system 38 via the hydraulic system of the traction vehicle 10, the steering of the drawbar via the actuator 54, which may be controlled by a control valve on-board the traction vehicle 10 via the hydraulic system of the traction vehicle 10, said control valve being provided on-board the traction vehicle 10 and being controlled by the control device 52 via the bus, and the control of the speed of the combination. However, other permutations for the fully automated or partially automated sequence are conceivable, for example by a control unit of the traction vehicle 10, or the above-described instructions to the driver. In addition to the avoidance of the bale rolling down, it is also achieved that the tractor driver from his position in the cab has a better view of the ejection process, which may be advantageous even in flat terrain.

The implement 12 is designed in this case as a roundbaler but could also collect and bundle any other harvested crops which are different from hay or grass. Moreover, the desired orientation of the deposited bundled material does not necessarily (only) have to be adapted to the slope inclination but could be selected, for example, in flat terrain such that the bundled material is damaged as little as possible by the effects of weather or may be collected in more easily. Should the traction vehicle 10, instead of having steerable wheels 20, be designed as a vehicle with articulated steering or be provided with crawler drives, which for the steering are drivable at a different speed, the activation of the associated actuators is carried out in a manner similar to the above description.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency trade-offs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element(s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. A system for picking up, bundling and depositing agricultural material having a traction vehicle and a towed implement, the system comprising:
    an actuator associated with the implement; and
    a control device configured to generate control data:
        for the actuator, resulting in the implement being laterally offset relative to the traction vehicle to move the implement into the appropriate orientation; and
        for controlling the orientation of the implement and steering of the traction vehicle, the control data including information relating to the orientation of the implement adjustable by the actuator, a desired orientation of the deposited agricultural material and at least one of a speed and a direction of travel of the traction vehicle;
    wherein, using the control data, the actuator adjusts the orientation about a vertical axis of the implement relative to the traction vehicle to deposit the agricultural material, and
    wherein the implement is laterally offset to the right when the implement has to be rotated counterclockwise relative to the direction of travel adopted when picking up the material and offset to the left when the implement has to be rotated clockwise relative to the direction of travel adopted when picking up the material.

2. The system of claim 1 wherein the implement has a crop pick-up system for picking up agricultural material, a bundling arrangement for bundling the agricultural material and a discharge for depositing the bundled material.

3. The system of claim 1 wherein the control device is configured to transmit the control data automatically to at least one of the actuator and a user interface for providing instructions to an operator for manual activation of the actuator.

4. The system of claim 1 wherein the control device is configured to transmit the control data corresponding to at least one of the speed and direction of travel of the traction vehicle to a steering actuator of the traction vehicle.

5. The system of claim 1 wherein the control device is configured to transmit control data corresponding to at least one of the speed and direction of travel of the traction vehicle to a user interface for providing instructions to an operator for manual activation of steering which may be actuated by the operator.

6. The system of claim 1 wherein the control device is configured to activate the lateral offset as a function of a working width of a crop pick-up system of the implement and a width determined by a sensor of a swath of material to be picked up.

7. The system of claim 1 wherein the control device is configured to provide control data which result in an actuation of the actuator and steering of the traction vehicle being terminated when the implement has reached the appropriate orientation.

8. The system of claim 1 wherein the control device is configured to, using the control data, activate the actuator and steer the traction vehicle based on values from at least one of an onboard sensor or a planned path based on the characteristics of the field.

9. The system of claim 1 wherein the implement is a round baler and the control device is configured to control the sequence such that a round bale deposited by the implement is oriented with its axis of symmetry parallel to a slope inclination of the field.

10. The system of claim 1 wherein the actuator is configured to adjust the angle of a drawbar between the traction vehicle and the implement relative to each other.

11. A method for picking up, bundling and depositing agricultural material having a traction vehicle and a towed implement, the method comprising:
    picking up an agricultural material from a field;
    bundling the agricultural material within the implement;
    generating control data, with a control device, corresponding to orientation of the implement, desired orientation of the deposited agricultural material and at least one of a speed and a direction of travel of the traction vehicle; and
    adjusting, with an actuator, the orientation of implement according to the control data, resulting in the implement being laterally offset relative to the traction vehicle to move the implement into the appropriate orientation such that bundled material will be deposited in a desired orientation different from a standard orientation, wherein the implement is laterally offset to the right when the implement has to be rotated counterclockwise relative to the direction of travel adopted when picking up the material and offset to the left when the implement has to be rotated clockwise relative to the direction of travel adopted when picking up the material.

12. A system for picking up, bundling and depositing agricultural material having a traction vehicle and a towed implement, the system comprising:

an actuator associated with the implement; and a control device configured to generate control data for controlling the orientation of the implement and steering of the traction vehicle, the control data including information relating to the orientation of the implement adjustable by the actuator, a desired orientation of the deposited agricultural material and at least one of a speed and a direction of travel of the traction vehicle, wherein, using the control data, the actuator adjusts the orientation about a vertical axis of the implement relative to the traction vehicle to deposit the agricultural material, and wherein after the end of a procedure in which the material is picked up and bundled, the control device is configured to provide control data for controlling the speed of the traction vehicle, which result in the traction vehicle being brought to a standstill.

13. The system of claim 12 wherein after the end of the procedure in which the material is picked up and bundled, the control device is configured to provide control data for the actuator, which result in the implement rotating relative to the traction vehicle about the vertical axis in the direction of the appropriate orientation.

14. The system of claim 13 wherein the control device is configured to issue a command for lifting up a crop pick-up system of the implement before providing the control data for the actuator.

15. The system of claim 14 wherein after the rotation of the implement about the vertical axis, which is effected by actuating the actuator, the control device is configured to provide control data for which result in the traction vehicle traveling in a different direction relative to the direction of travel when picking up the material.

16. The system of claim 15 wherein the traction vehicle travels in a direction of travel oriented to the left relative to the direction of travel relevant for the pick-up of the material when the implement has to be rotated counterclockwise into the appropriate orientation relative and in a direction of travel oriented to the right relative to the direction of travel relevant for the pick-up of the material when the implement has to be rotated clockwise into the appropriate orientation.

17. The system of claim 15 wherein the traction vehicle travels in a reverse direction, the control device configured to provide control data for steering the traction vehicle which result in the rotation of the traction vehicle running in the direction opposing the previous rotational direction, as soon as the angle between the traction vehicle and the implement has reached a maximum value as detected by a feedback sensor which senses the angle between a drawbar and the implement or traction vehicle.

* * * * *